(12) United States Patent
Ferguson et al.

(10) Patent No.: US 10,878,194 B2
(45) Date of Patent: Dec. 29, 2020

(54) SYSTEM AND METHOD FOR THE DETECTION AND REPORTING OF OCCUPATIONAL SAFETY INCIDENTS

(71) Applicant: Walmart Apollo, LLC, Bentonville, AR (US)

(72) Inventors: David Ferguson, Bentonville, AR (US); Saba Beyene, Fayetteville, AR (US); Srinivas Talluri, Bentonville, AR (US); Christopher Davis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 112 days.

(21) Appl. No.: 16/216,322

(22) Filed: Dec. 11, 2018

(65) Prior Publication Data
US 2019/0179889 A1 Jun. 13, 2019

Related U.S. Application Data

(60) Provisional application No. 62/596,991, filed on Dec. 11, 2017.

(51) Int. Cl.
*G06F 40/284* (2020.01)
*G06N 20/20* (2019.01)
(Continued)

(52) U.S. Cl.
CPC .......... *G06F 40/284* (2020.01); *G06F 40/205* (2020.01); *G06K 9/626* (2013.01); *G06N 20/20* (2019.01); *G06Q 10/105* (2013.01)

(58) Field of Classification Search
CPC ........ G06F 40/284; G06F 40/00; G06F 40/10; G06F 40/103; G06F 40/14; G06F 40/151;
(Continued)

(56) References Cited

U.S. PATENT DOCUMENTS

2004/0078190 A1 4/2004 Fass et al.
2012/0254333 A1* 10/2012 Chandramouli ..... G06Q 10/107
709/206
(Continued)

FOREIGN PATENT DOCUMENTS

WO 2017106904 A1 6/2017

OTHER PUBLICATIONS

International Search Report and Written Opinion from related International Patent Application No. PCT/US2018/064944 dated Feb. 15, 2019.

*Primary Examiner* — Qi Han
(74) *Attorney, Agent, or Firm* — McCarter & English, LLP

(57) ABSTRACT

An system and a method for the detection and reporting of occupational safety incidents are disclosed. The system receives a set of digital records corresponding to reported occupational safety incidents. The system converts each of the digital records from the set of digital records into a common digital format. The system deconstructs the uniform text structure of each digital recorded by a natural language processing module to lemmatize words, remove punctuation, and remove stop words. The system creates a feature vector based on the received deconstructed uniform text structure. The system inputs each feature vector to an ensemble machine learning data model, returning a determination of a possible class or characteristic of occupational safety incident. The system applies a threshold based on a probability to the determination of a possible class. The system submits a subset of the reported occupational safety incidents to a third party system.

20 Claims, 8 Drawing Sheets

(51) Int. Cl.
*G06K 9/62* (2006.01)
*G06Q 10/10* (2012.01)
*G06F 40/205* (2020.01)

(58) Field of Classification Search
CPC ........ G06F 40/154; G06F 40/16; G06F 40/20; G06F 40/205; G06F 40/211; G06F 40/216; G06F 40/237; G06F 40/40; G06F 40/44
USPC .............................. 704/9, 10, 1, 5, 6, 7, 257
See application file for complete search history.

(56) References Cited

U.S. PATENT DOCUMENTS

| | | | |
|---|---|---|---|
| 2014/0229408 A1* | 8/2014 | Vijayaraghavan | G06N 5/025 706/12 |
| 2014/0316768 A1 | 10/2014 | Khandekar | |
| 2015/0254566 A1 | 9/2015 | Chandramouli et al. | |
| 2017/0177715 A1* | 6/2017 | Chang | G06F 40/186 |
| 2018/0322508 A1* | 11/2018 | Walthers | G06F 40/279 |

* cited by examiner

COMPLIANCE REPORTS UPLOAD PORTAL

| CLAIM # | CLAIM DESC | BODY PART | HOSPITALIZED IND | HEART IND | DEATH IND | INITIAL TREATMENT | VERDICT |
|---|---|---|---|---|---|---|---|
| claim_nbr | cz_claim_desc | body_part_injured | hospitalid_heart_ind | death_ind | cz_init_tr | Reportable | CHANGE VERDICT |

Choose File | No file chosen

Visual Design
Upload

FIG. 5

COMPLIANCE REPORTS UPLOAD PORTAL

Time taken to load data : 0.64 secs    Time taken to process : 3.43 secs    Incidents Classified : 52316    [Choose File] No file chosen  [Upload]  [Visual Design]

| CLAIM # | CLAIM DESC | BODY PART | HOSPITALIZED | HEART IND | DEATH IND | INITIAL TREATMENT | VERDICT | CHANGE VERDICT |
|---|---|---|---|---|---|---|---|---|
| claim_nbr | cz_claim_desc | body_part_injured | hospitali | heart_ind | death_ind | cz_init_tr | Reportable | |
| XXX-XX-XX-XXX | CUT/BRUISED/SWOLLEN RIGHT HAND | HAND(S) | 0 | 0 | 0 | 1.0 | NOT REPORTABLE | ▼ ... |
| XXX-XX-XX-XXX | VICKIE WAS CLEANING THE DONUT GLAZER WHEN SHE DROPPED PART OF IT AND CUT HER HANDS WITH THE SHARP ENDS. | HAND(S) | 0 | 0 | 0 | 4.0 | REVIEW | ▼ ... |
| XXX-XX-XX-XXX | TRIPPED OVER HIS FEET AND FELL ON TOP OF GRID | THIGH(S) | 0 | 0 | 0 | 1.0 | NOT REPORTABLE | ▼ ... |
| XXX-XX-XX-XXX | UNWRAPPING A PALLET | KNEE(S) | 0 | 0 | 0 | 3.0 | NOT REPORTABLE | ▼ ... |
| XXX-XX-XX-XXX | SLIPPED ON SOME FLOOR CLEANER THAT WAS NOT CLEANED UP | Skin/Soft Tissue | 0 | 0 | 0 | 3.0 | NOT REPORTABLE | ▼ ... |
| XXX-XX-XX-XXX | WAS LIFTING A CASE OF STRAWBERRIES | SHOULDER(S) | 0 | 0 | 0 | 2.0 | NOT REPORTABLE | ▼ ... |
| XXX-XX-XX-XXX | TAKING TRASH OUT OF TRASH CAN HIT FINGER ON TRASH CAN | HAND(S) | 0 | 0 | 0 | 3.0 | NOT REPORTABLE | ▼ ... |
| XXX-XX-XX-XXX | WAS COMING BACK TO SELF CHECK AND WAS HURRING AND STEP | ANKLE(S) | 0 | 0 | 0 | 3.0 | NOT REPORTABLE | ▼ ... |

FIG. 6

SYSTEM AND METHOD FOR THE DETECTION AND REPORTING OF OCCUPATIONAL SAFETY INCIDENTS

CROSS-REFERENCE TO RELATED PATENT APPLICATIONS

This application claims priority to U.S. Provisional Application No. 62/596,991 filed on Dec. 11, 2017, the content of which is hereby incorporated by reference in its entirety.

BACKGROUND

Claims regarding occupational safety incidents within an organization can originate through disparate reporting systems. The mechanics in evaluating the claims from these disparate reporting systems are inefficient, subjective, and inconsistent.

BRIEF DESCRIPTION OF DRAWINGS

Illustrative embodiments are shown by way of example in the accompanying drawings and should not be considered as a limitation of the present disclosure:

FIG. 5 is a user interface view illustrating a reportable occupational safety incident according to an exemplary embodiment.

FIG. 6 is a user interface illustrating a composite view of multiple occupational safety incident according to an exemplary embodiment.

DETAILED DESCRIPTION

Described in detail herein is a system that receives occupational safety incidents from disparate sources within an organization. The incidents from the disparate sources can be received in different formats. The system can pre-process the incidents and convert the incidents into a common digital format. The resultant converted incidents can be input into a machine learning data model to determine whether the incident is reportable. The converted incidents are compared against a soft-max layer probability generation and then provided to a reporting interface for investigation.

Figure 1:
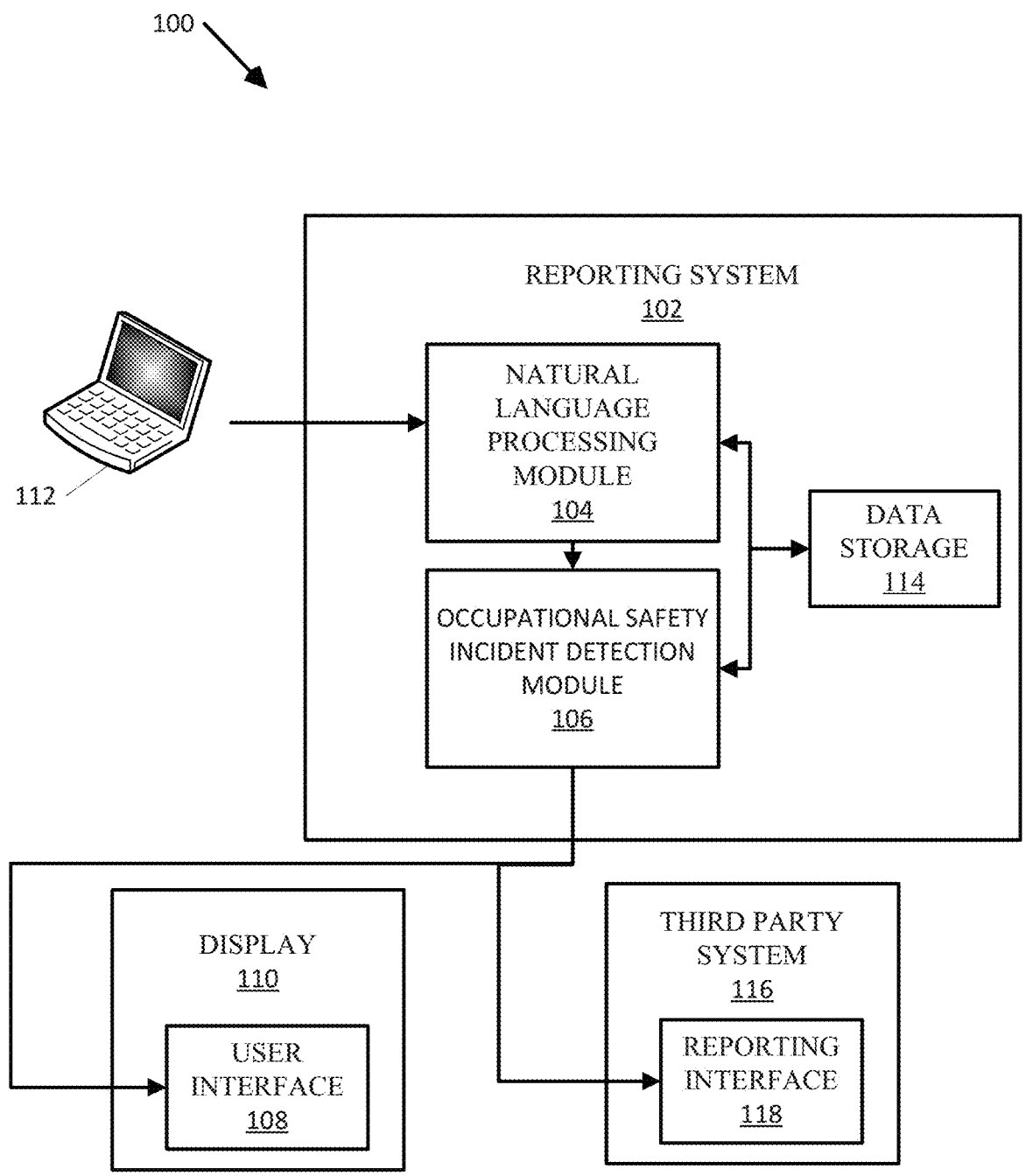
FIG. 1 is a block diagram illustrating a system for the detection and reporting of occupational safety incidents according to an exemplary embodiment.

FIG. 1 is a block diagram illustrating a system 100 for the detection and visualization of reported occupational safety incidents according to an exemplary embodiment. The system includes a reporting system 102 comprising a natural language processing module 104, an occupational safety incident detection module 106, and data storage 114. A user interface 108 can be coupled to a display 110 to present a user a view of reportable and not reportable occupational safety incidents. Alternatively, a third party system 116 can be coupled to the occupational safety incident detection module 106 through a reporting interface 118 to automatically report any reportable occupational safety incidents.

The reporting system 102 hosts the processing components for the system 100. The reporting system 102 can be implemented on a computing device. The implementation can take the form of a physical server or a virtual server. Hardware utilized for the system can be distributed across logical resources allocated for the system that can be housed in one server, or distributed virtually across multiple pieces of hardware.

The natural language processing (NLP) module 104 provides an entry point into the reporting system 102. An application programming interface (API) for the NLP module 104 provides an input point into the reporting system 102. The API for the NLP module 104 can provide a well defined interface for the input of occupational safety incidents into the reporting system 102. The API for the NLP module 104 can provide bindings for popular software development languages including but not limited to C++ and JAVA. Additionally, the API for the NLP module 104 can provide bindings for popular scripting languages including but not limited to python and Perl. The NLP module 104 provides functionality for processing occupational safety incidents details. The processing functionality includes removing special characters and standard text from different source systems. For example, the NLP module 104 can remove addressing header components from email sources. The NLP module 104 processes the occupational safety incidents to remove punctuation and stop words. Additionally, the NLP module 104 parses the remaining text to lemmatize words based on the part of sentence. The NLP module 104 utilizes the lemmatized words to create a data structure to be utilized in machine learning models. Each of the occupational safety incidents are parsed by the NLP module 104 and stored in a common digital format for uniform processing in a machine learning model.

An occupational safety incident detection module 106 receives input from the NLP module 104. The occupational safety incident detection module 106 receives each of the occupational safety incidents from the NLP module 104 in a common digital format. The occupational safety incident detection module 106 interfaces with one or more machine learning models. The occupational safety incident detection module 106 utilizes the occupational safety incidents in a common digital format as input as training or testing data for the one or more machine learning models. The occupational safety incidents can be normalized by the occupational safety incident detection module 106 to provide appropriate input into the one or more machine learning models. The machine learning models can be a stand-alone application or alternatively be provided as a third party library encompassing the functionality required to make predictive analysis based on a set of training data.

The one or more machine learning models utilized by the occupational safety incident detection module 106 can include an Adaptive Neuro-Fuzzy Inference System (ANFIS). The occupational safety incident detection module 106 utilizes the ANFIS to infer whether an occupational safety incident is actually a reportable occupational safety incident (e.g. a binary determination of yes or no). Additionally, an ensemble machine learning model, such as a Random Forest model, can be utilized to increase the predictive power of the system. The resulting modelling can be normalized utilizing weights, and optimizations.

Coupled to the NLP module 104 and the occupational safety incident detection module 106 is data storage 114. Data storage 114 can be utilized for storing intermediate data product when utilizing large data sets such as when processing an ensemble model. Additionally the data storage 114 provides non-volatile storage for the training results that applies to the testing data in subsequent processing. The data storage 114 can provide support for queuing the occupational safety incidents input in the event the NLP module 104 is saturated and cannot process the incoming occupational safety incidents.

A user interface 108 presents the data output by the occupational safety incident detection module 106 to a third party system 110. The user interface 108 presents cases in either a batch view or an individual case detail view. The batch view displays more than one occupational safety incidents organized based on the ANFIS and a reporting based occupational safety incident determination. The individual case detail view provides organization based on the details of the occupational safety incident including a claim number, a description of the incident as well as the reportability of the occupational safety incident. The display 110 can take the form of a computer display. The display 110 can be implemented by but not limited to cathode ray tube (CRT), light emitting diode (LED), organic light emitting diode (OLED), or liquid crystal display (LCD) technologies.

Additionally the reporting system 102 can present the reportable occupational safety incident directly to a third party system 116. Utilizing a reporting interface 118, the occupational safety incident detection module 106 can report occupational safety incidents that have a high confidence of correct prediction directly to the necessary third party. The reporting interface 118 can take the form of an application programming interface (API) that interfaces with the third party system 116. The reporting interface 118 can provide well-defined protocols for interacting with the third party system 116 including connection establishment, authentication, data transmittal, and disconnection.

Exterior to the reporting system 102 are the submission system(s) 112 for occupational safety incidents. The submission system(s) 112 include, but are not limited to, email, submission portals, and web portals. The submission system(s) 112 can provide one or more protocols for submitting a potential occupational safety incident. For example, the computing device embodiment can provide a website interface for enforcing a protocol for submission.

Figure 2A:
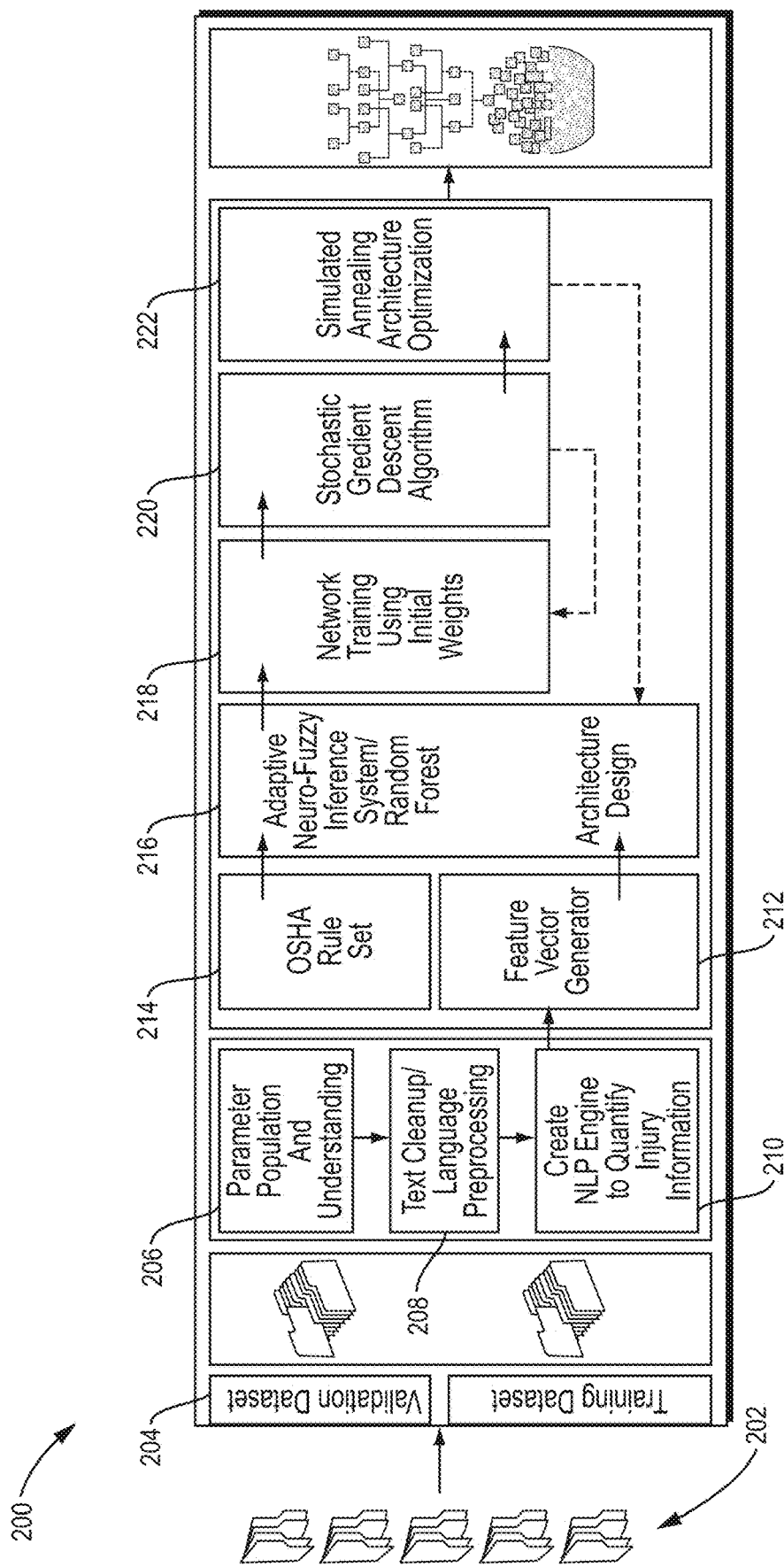
FIG. 2A is flow diagram illustrating the training of a system for the detection and reporting of occupational safety incidents according an exemplary embodiment.

FIG. 2A is flow diagram illustrating training an embodiment of the system 100 for the detection and reporting of occupational safety incidents according an exemplary embodiment.

A set of occupational safety incident reports 202 consist of all the reports of safety incidents that have been reported through the submission system 112. The set of occupational safety incident reports 202 can contain information relevant to each safety incident that occurred at a facility. Various parameters for each of the reports document details of the safety incident including time, parties involved, and the nature of the incident. Within the set of occupational safety incident reports 202 is a reportable class of safety incident reports, where the safety incident meets the characteristics of a reportable safety incident.

The set of occupational safety incident reports 202 can be converted into datasets 204 by the NLP module 104. The datasets can be used for both training and validation purposes. Both training and validation datasets can be utilized to build the occupational safety incident model and verify the model is operating correctly. The set of occupational safety incident reports 202 can be converted from one format into another applicable to the datasets 204 to facilitate processing.

The NLP module 104 executes parameter population and understanding 206. The NLP module 104 extracts the various parameters for each of the reports and converts them into a usable format for further extraction.

Text Cleanup/Language Preprocessing 208 can be performed by the NLP module 104. The NLP module 104 removes special characters and standard text not necessary or relevant to the data processing. Additionally, the NLP module 104 removes punctuation and stop words or commonly used words that do not add any additional meaning to the text.

The NLP module 104 can create/build a NLP engine to quantify injury information 210. The NLP engine can parse text, build parse trees based on the parsed text and lemmatize words to represent syntactic structures of strings. The words can be lemmatized based on a part of sentence (POS) tag to apply contextual meaning to the word.

A feature vector generator 212, as part of the NLP module 104, translates the parse trees and the relevant lemmatized words into normalized vectors for processing the occupational safety incident reports. Depending on the machine learning model being utilized, the feature vector generator 212 can be implemented specifically to support the inputs required by the machine learning model.

An Occupational Safety and Health (OSHA) ruleset 214 can be implemented as part of the NLP module 104. The OSHA ruleset 214 provides the basis of which kinds of safety incidents are reportable to OSHA. For example, an injury resulting in serious bodily harm can be defined by OSHA as a reportable safety incident. An injury not resulting in serious bodily harm can be defined by OSHA as a non-reportable safety incident. The OSHA ruleset 214 can be updated when new OSHA guidelines on reportability are updated.

The occupational safety incident detection module 106 (FIG. 1) receives both the OSHA ruleset 214 as well as the output from the feature vector generator 212 to provide as input for the Adaptive Neuro-Fuzzy Inference System (ANFIS) 216. Alternatively, an ensemble machine learning data model, such as a Random Forest model, can be utilized instead of the ANFIS 216. The ANFIS 216 or the ensemble machine learning data model utilize the output of the feature vector generator 212 to build a data model for the classification of the safety incidents. Utilizing training 204 datasets, the ANFIS 216 or the ensemble machine learning data model can utilize the various characteristics of the safety reports in conjunction with a prior determination of reportability to create a hyperplane calculation. The hyperplane corresponds with the distinction between the reportable cases and the non reportable cases based on the various characteristics.

Upon receiving the dataset, the ANFIS 216, through training, undergoes optimization steps. After the ANFIS 216 has been initially trained, the ANFIS 216 output is augmented by network training using initial weights 218. In training the ANFIS 216, the weights are utilized to allow the network to learn quickly and to avoid saturation. The output can be weighted based on the various characteristics of the safety incidents and how they are normalized. The weighting provides additional confidence when the training dataset is small.

During the training a stochastic gradient descent algorithm 220 can be utilized on the ANFIS 216 output. The stochastic gradient descent algorithm 220 attempts to find a minima or maxima of a possible class by iteration through the training data. The stochastic gradient descent algorithm 220 provides reinforcement for the ANFIS 216 or ensemble model. Simulated annealing architecture optimization 222 assists in training the ANFIS 216 faster and with more accurate results by approximating a global optimum in the ANFIS 216. The optimization techniques provide reinforcing learning for the ANFIS 216 or ensemble model.

Figure 2B:
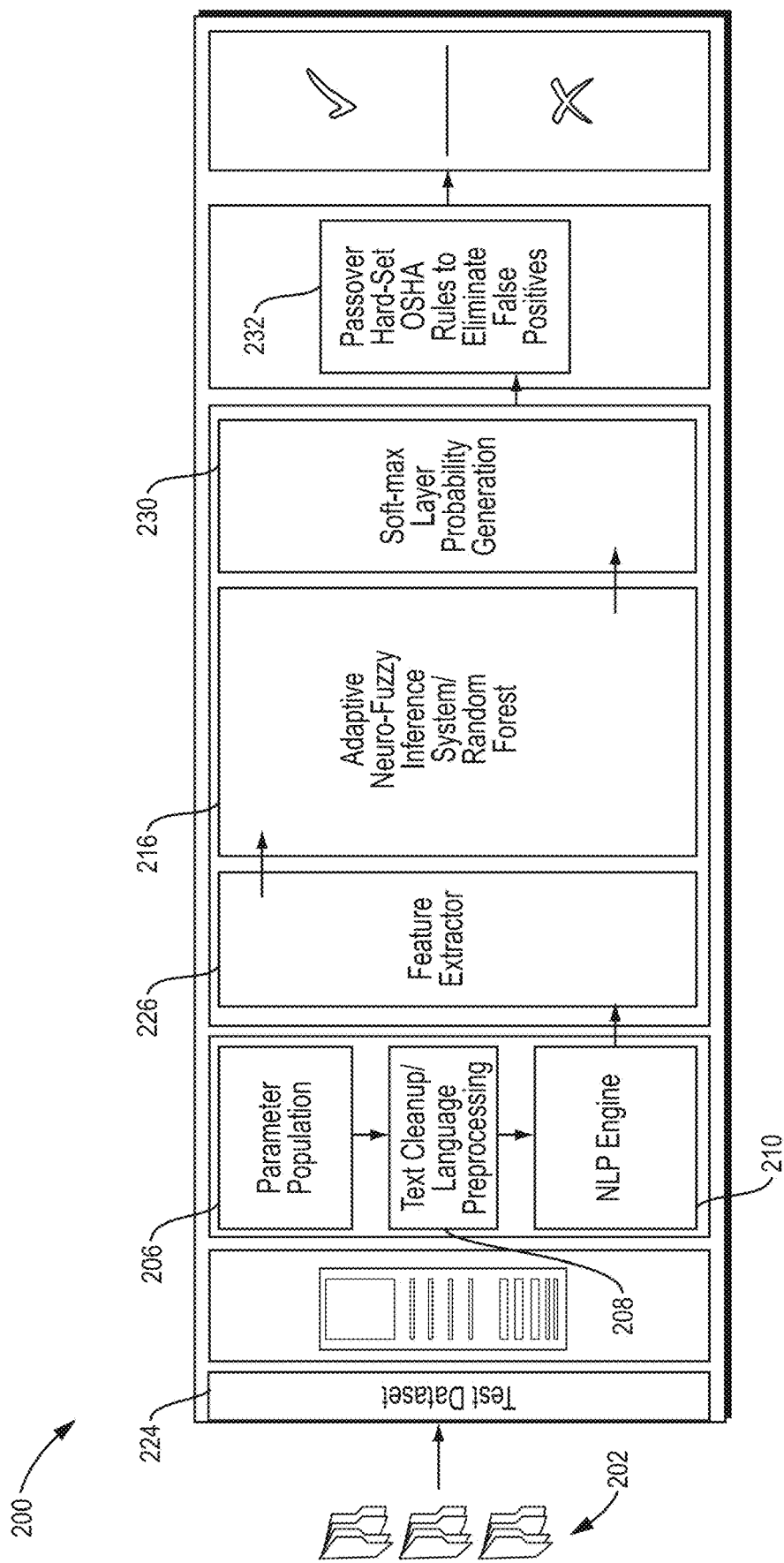
FIG. 2B is flow diagram illustrating the application of a system for the detection and reporting of occupational safety incidents according an exemplary embodiment.

FIG. 2B is flow diagram illustrating an application of an embodiment of the system for the detection and reporting of occupational safety incidents according an exemplary embodiment. The processing of the safety incidents in FIG. 2B is similar to that of the training and validation in FIG. 2A. However, in FIG. 2B the data does not have a reportability characteristics present, and utilizes the "learned" behavior from the training in FIG. 2A to determine a reportability characteristic.

Similar to FIG. 2A, in FIG. 2B occupational safety incident reports 224 are utilized for input into the reporting system 102. The test dataset 226 is utilized to infer a reportablity characteristic. The test dataset 226 is converted and processed in the same manner as the training and validation datasets 204. The NLP module 104 executes parameter population and understanding 206 as with the training dataset in FIG. 2A. The NLP module 104 extracts the various parameters for each of the reports and converts them into a usable format for further extraction.

Text Cleanup/Language Preprocessing 208 can be performed by the NLP module 104. The NLP module 104 removes special characters and standard text not necessary or relevant to the data processing. Additionally, the NLP module 104 removes punctuation and stop words or commonly used words that do not add any additional meaning to the text.

The NLP module 104 can create a NLP engine to quantify injury information 210. The NLP engine can parse text, and build parse trees based on the parsed text and lemmatize words. The words can be lemmatized based on a part of sentence (POS) tag to apply contextual meaning to the word.

Similar to FIG. 2A, a feature extractor 226, as part of the NLP module 104 in FIG. 2B, translates the parse trees and the relevant lemmatized words into normalized vectors for processing the occupational safety incident reports. Depending on the machine learning model being utilized, the feature vector generator can be implemented specifically to support the inputs required by the machine learning model.

The occupational safety incident detection module 106 receives the output from the feature extractor 226 to provide as input for the Adaptive Neuro-Fuzzy Inference System (ANFIS) 216. The ANFIS 216 utilizes the training provided in FIG. 2A to determine a reportability characteristics based on past reportable safety incidents and common characteristics between the test dataset and the training datasets. Soft-max layer probability generation 230 can be used to increase the probability of the correct classification of reportability.

As an additional step to further limit false positives, a passover hard-set of the OSHA rules 232 can be performed by the occupational safety incident detection module 106. The occupational safety incident detection module 106 utilizes the OSHA ruleset 214 with the reportability characteristic separate from the ANFIS 216 to independently validate that the characteristics presented in the safety incident corresponds with a reportable safety incident. If the passover hard-set of the OSHA rules 220 is successful the safety incident is reported 222. The safety incident can be reported manually through human interaction with the display 110 and the user interface 108. Alternatively, the occupational safety incident detection module 106 can utilize the reporting interface 118 of the third party system 116 to report the safety incident directly.

Figure 3:
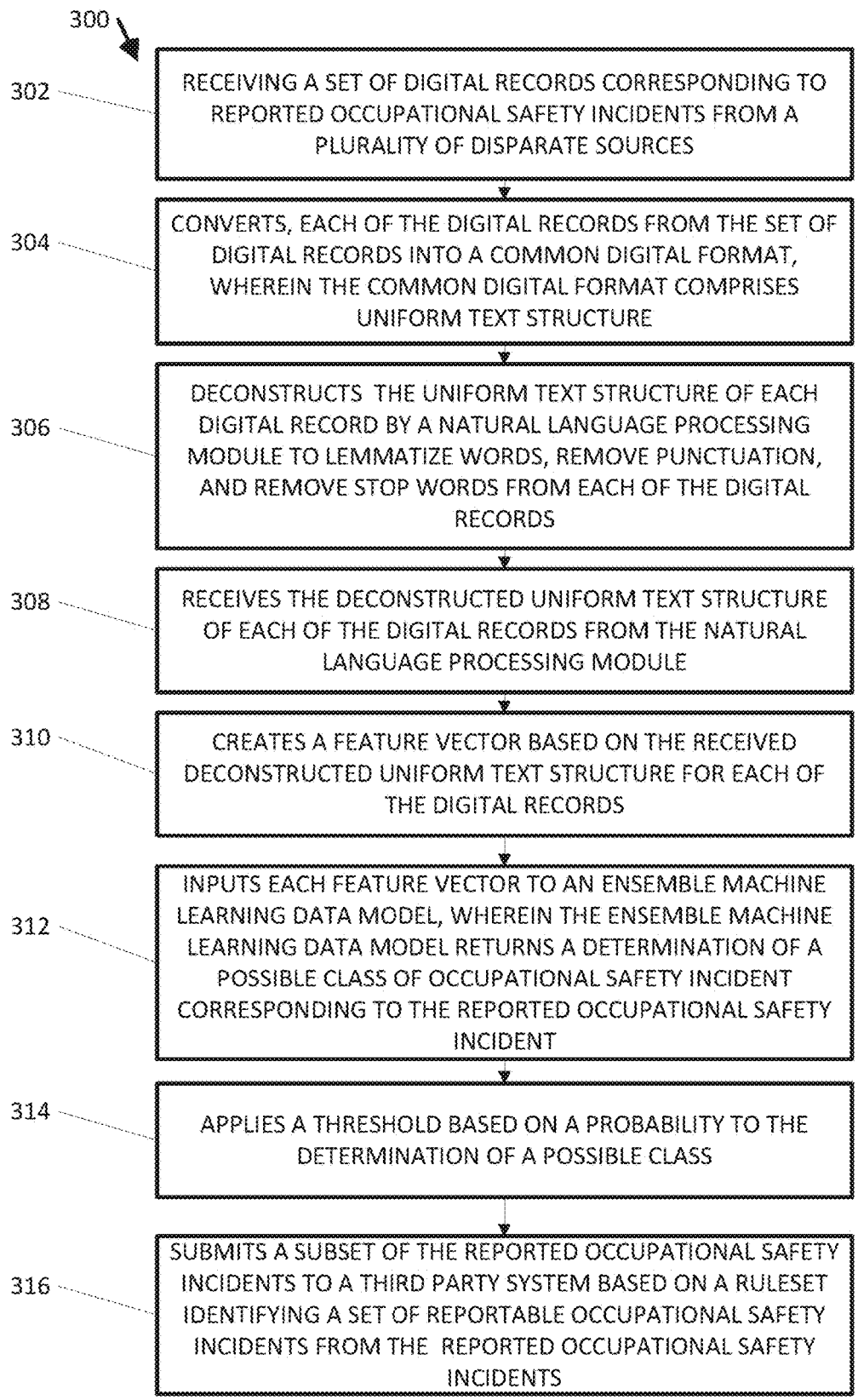
FIG. 3 is a flowchart illustrating a process for the detection and reporting of occupational safety incidents according an exemplary embodiment.

FIG. 3 is a flowchart illustrating a process for the detection and visualization of occupational safety incidents according an exemplary embodiment.

At step 302, the natural language processing module 104 receives a set of digital records corresponding to a reported occupational safety incidents a plurality of disparate systems. Disparate systems can include systems designed for reporting safety incidents, physical files detailing safety incidents that have been transcribed to a digital medium, and systems not inherently designed for reporting safety incidents yet capture details relevant to safety incidents.

At step 304, the natural language processing module 104 converts each of the digital records from the set of digital records into a common digital format, wherein the common digital format comprise uniform text structure.

At step 306, the natural language processing module 104 deconstructs the uniform text structure of each digital recorded by a natural language processing module to lemmatize words, remove punctuation, and remove stop words from each of the digital records. The NLP module 104 processes each field of the digital record and parses sentence structure to create a parse tree. The parse tree can include the lemmatized words to provide context and meaning to the words in the tree based on their position in the tree.

At step 308, the occupational safety incident detection module 106 receives the deconstructed uniform text structure of each of the digital records from the natural language processing module. The parse tree, or a derived data structure containing the same or similar data, can be transmitted to the occupational safety incident detection module 106 by the NLP module 104. The transmission, in a distributed environment can include the packaging of the data structure in network packets. Alternatively, the transmission in a single server can be a notification that the data structure is available at a certain address in computer memory.

At step 310, the occupational safety incident detection module 106 creates a feature vector based on the received deconstructed uniform text structure for each of the digital records. The feature vector can include a data normalization step to prepare the data for input into a machine learning data model.

At step 312, the occupational safety incident detection module 106 inputs each feature vector to an ensemble machine learning data model, wherein the ensemble machine learning data model returns a determination of a possible class of occupational safety incident corresponding to the reported occupational safety incident.

At step 314, the occupational safety incident detection module 106 applies a threshold based on a probability to the determination of a possible class. A soft-max layer probability generation can be utilized as a probability threshold. Additionally, a hard-set pass over a ruleset can eliminate false positives independent of the ensemble machine learning data model.

At step 316, the occupational safety incident detection module 106 submits a subset of the reported occupational safety incidents to a third party system based on a ruleset identifying a set of reportable occupational safety incidents from the reported occupational safety incidents.

Figure 4:
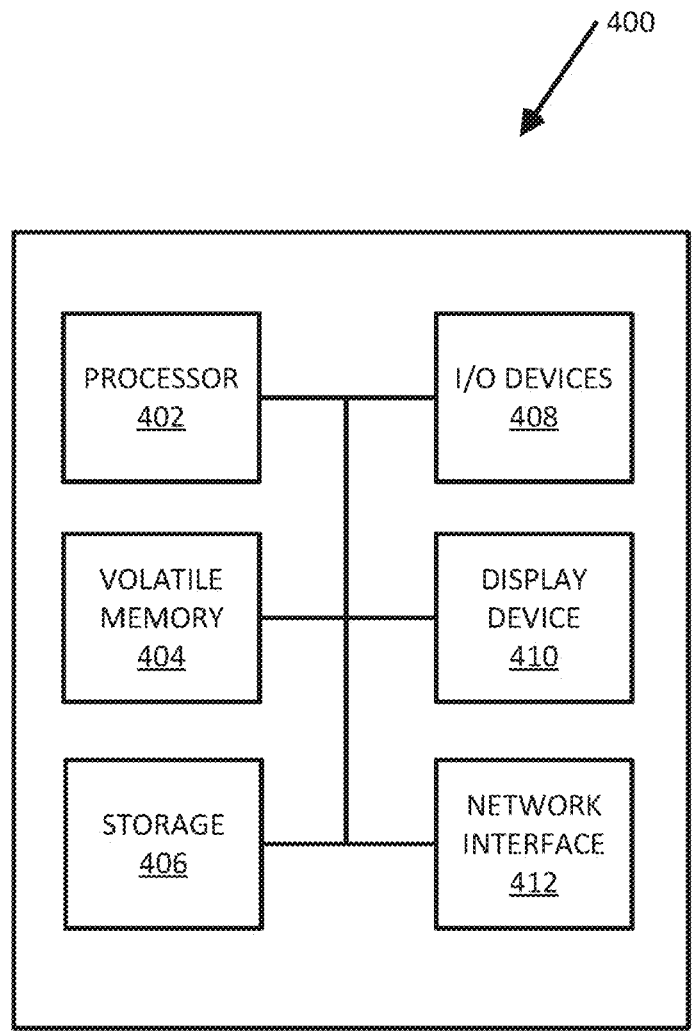
FIG. 4 is a block diagram illustrating an electronic device for the detection and reporting of occupational safety incidents according to an exemplary embodiment.

FIG. 4 is a block diagram illustrating an electronic device for the detection and visualization of occupational safety incidents according to an exemplary embodiment.

A computing device 400 supports the detection and reporting of occupational safety incidents. The computing device 400 can embody the reporting system 102 on which the natural language processing module 104 and the occupational safety incident detection module 106 can execute on. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, volatile memory 404 included in the computing device 400 can store computer-readable and computer-executable instructions or software for implementing exemplary operations of the computing device 400. The computing device 400 also includes configurable and/or programmable processor 402 for executing computer-readable and computer-executable instructions or software stored in the volatile memory 404 and other programs for implementing exemplary embodiments of the present disclosure. Processor 402 can be a single core processor or a multiple core processor. Processor 402 can be configured to execute one or more of the instructions described in connection with computing device 400.

Volatile memory 404 can include a computer system memory or random access memory, such as DRAM, SRAM, EDO RAM, and the like. Volatile memory 404 can include other types of memory as well, or combinations thereof.

A user can interact with the computing device 400 through a display 410, such as a computer monitor, which can display one or more graphical user interfaces supplemented by I/O devices 408, which can include a multi-touch interface, a pointing device, an image capturing device and a reader.

The computing device 400 can also include storage 406, such as a hard-drive, CD-ROM, or other computer-readable media, for storing data and computer-readable instructions and/or software that implement exemplary embodiments of the present disclosure (e.g., applications). For example, storage 406 can include one or more storage mechanisms for storing information associated inputs and outputs of machine learning data models and can be indexed accordingly.

The computing device 400 can include a network interface 412 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 412 can include one or more antennas to facilitate wireless communication between the computing device 400 and a network and/or between the computing device 400 and other computing devices. The network interface 412 can include a built-in network adapter, network interface card, PCMCIA network card, card bus network adapter, wireless network adapter, USB network adapter, modem or any other device suitable for interfacing the computing device 400 to any type of network capable of communication and performing the operations described herein.

FIG. 5 is a user interface 500 illustrates a reportable occupational safety incident according to an exemplary embodiment. The user interface 500 corresponds to one view that can be presented by the user interface 108 on the display 110 (FIG. 1). The user interface 500 in FIG. 5 corresponds to one safety incident. The safety incident can be displayed in a tabular form, where each row in the table includes a single safety incident. Columns in the tabular format correspond to characteristics of the safety incident. Characteristics can include a claim number 502, a claim description 504, claim details 506A, 506B, 506C, 508D, 508E, and a possible class 508. The possible class 508 is indicative of whether the occupational safety incident detection module 106 determined the safety incident was reportable or not.

FIG. 6 is a user interface 600 illustrating a composite view of multiple occupational safety incident according to an exemplary embodiment. The user interface 600 corresponds to one view that can be presented by the user interface 108 on the display 110 (FIG. 1). The user interface view 600 in FIG. 6 corresponds to an aggregate of safety incidents. The safety incidents can be displayed in a tabular form, where each row in the table includes a single safety incident. Similar to FIG. 5, in FIG. 6, columns in the tabular format correspond to characteristics of the safety incident. Characteristics can include the claim number 502, the claim description 504, the claim details 506A, 506B, 506C, 508D, 508E, and the possible class 508. The possible class is indicative of whether the occupational safety incident detection module 106 determined the safety incident was reportable or not. Additionally, the user interface 108 can present the user an option to override the determination 602 or "change the verdict." To facilitate this action, the user interface 118 can provide a dropdown box to allow the user to select a different verdict than what was determined by the occupational safety incident detection module 106.

Figure 7:
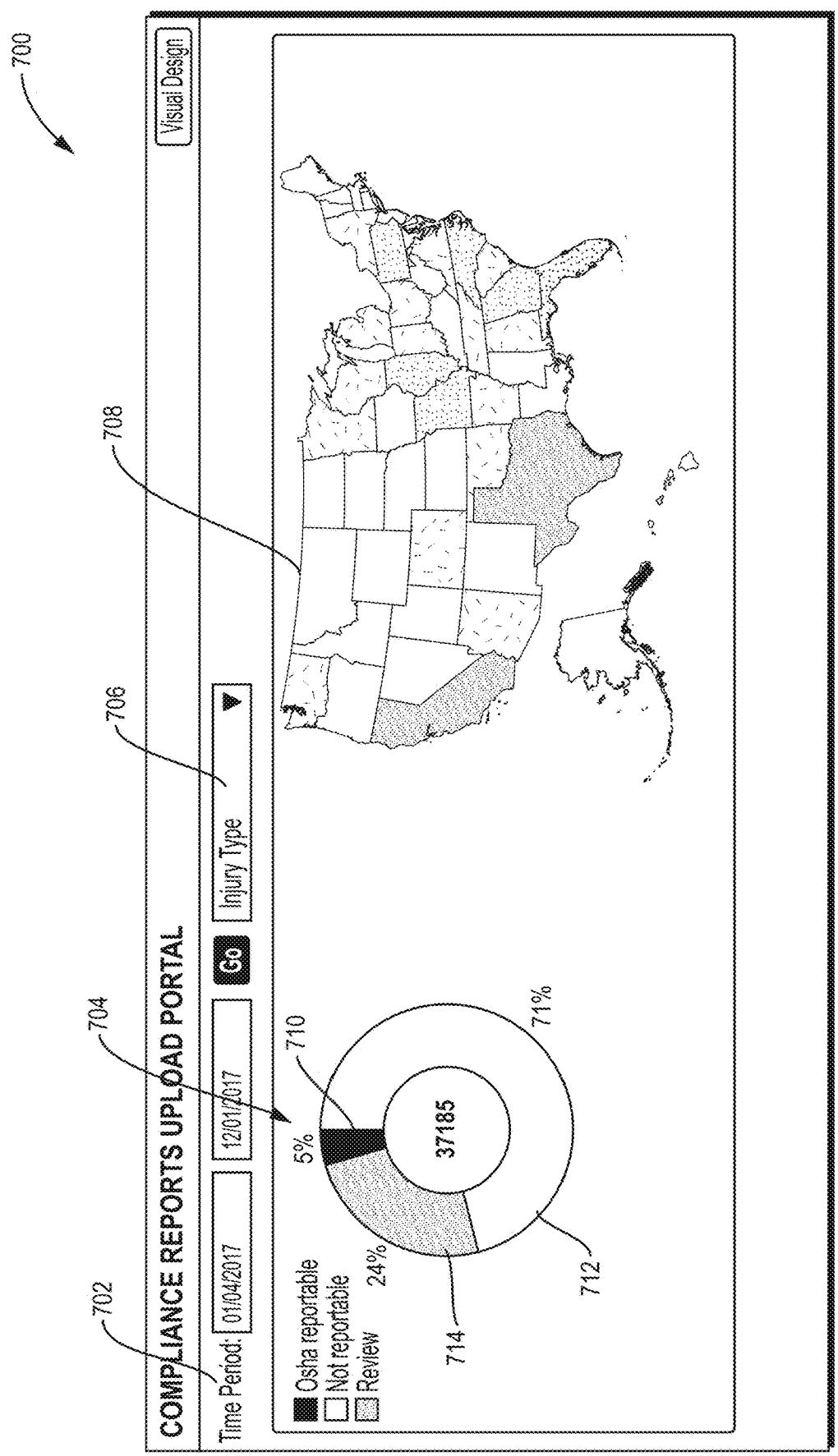
FIG. 7 is a user interface illustrating market-specific view corresponding to all processed occupational safety incidents according to an exemplary embodiment.

FIG. 7 is a user interface 700 illustrating market-specific view corresponding to all processed occupational safety incidents according to an exemplary embodiment. The user interface 700 corresponds to one view that can be presented by the user interface 108 on the display 110 (FIG. 1). The user interface 700 corresponds to an aggregate of safety incidents based on a geographic region of reporting. The geographic region 708 indicates an overview of the complete reporting region. The geographic region 708 can include visual descriptors to indicate a relative volume in reportable safety incidents. The user interface 700 provides a dropdown 706 for adjusting the data view based on the injury classification as determined by the characteristics. The user interface 700 can provide a graphical display 704 as a proportion of the of the entire dataset. The user interface 700 can provide adjustable time frames 702 to allow a user to view the reportable safety incidents by geographic region 708 and proportional graphical display 704 (including a break-out of OSHA reportable incidents 710, non-reportable incidents 712, and incidents for further review 714).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A system for the detection and reporting of occupational safety incidents comprising:
    a plurality of disparate systems for reporting occupational safety incidents;
    a reporting system, communicatively coupled to the plurality of disparate systems;
    a natural language processing module configured to execute on the reporting system, wherein execution of the natural language processing module causes the reporting system to:
        receive a set of digital records corresponding to reported occupational safety incidents from the plurality of disparate sources,
        convert each of the digital records from the set of digital records into a common digital format, wherein the common digital format comprises uniform text structure, and
        deconstructs the uniform text structure of each of the digital records to lemmatize words, remove punctuation, and remove stop words,
    an occupational safety incident detection module configured to execute on the reporting system, wherein execution of the occupational safety incident detection module causes the reporting system to:
        receive the deconstructed uniform text structure of each of the digital records from the natural language processing module,
        create a feature vector based on the received deconstructed uniform text structure for each of the digital records,
        input each feature vector to an ensemble machine learning data model, wherein the ensemble machine learning data model returns a determination of a possible class of occupational safety incident corresponding to the reported occupational safety incident,
        apply a threshold based on a probability to the determination of a possible class, and
        submit a subset of the reported occupational safety incidents to a third party system based on a ruleset identifying a set of reportable occupational safety incidents from the reported occupational safety incidents.

2. The system of claim 1 wherein the set of reportable occupational safety incidents in part trains the ensemble machine learning data model.

3. The system of claim 1 wherein the ensemble machine learning data model is trained utilizing initial weights.

4. The system of claim 1 wherein a minimum and maximum value for the possible class is determined based on a stochastic gradient descent.

5. The system of claim 1 wherein the ensemble machine learning data model comprises a random forest model.

6. The system of claim 1, wherein an optimum value for the possible class is determined based on a simulated annealing optimization.

7. The system of claim 1, wherein the converting each digital record comprises removing special characters and text formatting information from each digital record.

8. A method for the detection and reporting of occupational safety incidents comprising:
    receiving a set of digital records corresponding to reported occupational safety incidents from a plurality of disparate sources;
    converting each of the digital records from the set of digital records into a common digital format, wherein the common digital format comprises uniform text structure;
    deconstructing the uniform text structure of each of the digital records by a natural language processing module to lemmatize words, remove punctuation, and remove stop words;
    receiving the deconstructed uniform text structure of each of the digital records from the natural language processing module;
    creating a feature vector based on the received deconstructed uniform text structure for each of the digital records;
    inputting each feature vector to an ensemble machine learning data model, wherein the ensemble machine learning data model returns a determination of a possible class of occupational safety incident corresponding to the reported occupational safety incident;
    applying a threshold based on a probability to the determination of a possible class; and
    submitting a subset of the reported occupational safety incidents to a third party system based on a ruleset identifying a set of reportable occupational safety incidents from the reported occupational safety incidents.

9. The method of claim 8 wherein the set of reportable occupational safety incidents in part trains the ensemble machine learning data model.

10. The method of claim 8 wherein the ensemble machine learning data model is trained utilizing initial weights.

11. The method of claim 8 wherein a minimum and maximum value for the possible class is determined based on a stochastic gradient descent.

12. The method of claim 8, wherein the ensemble machine learning data model comprises a random forest model.

13. The method of claim 8, wherein an optimum value for the possible class is determined based on a simulated annealing optimization.

14. The method of claim 8, the converting further comprises removing special characters and text formatting information from each digital record.

15. A non-transitory computer readable medium, having stored thereon, instructions that when executed by a computing device, cause the computing device to perform operations comprising:
    receiving a set of digital records corresponding to reported occupational safety incidents from a plurality of disparate sources;

converting each of the digital records from the set of digital records into a common digital format, wherein the common digital format comprises uniform text structure;

deconstructing the uniform text structure of each of the digital records by a natural language processing module to lemmatize words, remove punctuation, and remove stop words;

receiving the deconstructed uniform text structure of each of the digital records from the natural language processing module;

creating a feature vector based on the received deconstructed uniform text structure for each of the digital records;

inputting each feature vector to an ensemble machine learning data model, wherein the ensemble machine learning data model returns a determination of a possible class of occupational safety incident corresponding to the reported occupational safety incident;

applying a threshold based on a probability to the determination of a possible class; and submitting a subset of the reported occupational safety incidents to a third party system based on a ruleset identifying a set of reportable occupational safety incidents from the reported occupational safety incidents.

16. The computer readable medium of claim 15 wherein the set of reportable occupational safety incidents in part trains the ensemble machine learning data model.

17. The computer readable medium of claim 15 wherein the ensemble machine learning data model is trained utilizing initial weights.

18. The computer readable medium of claim 15 wherein a minimum and maximum value for the possible class is determined based on a stochastic gradient descent.

19. The computer readable medium of claim 15, wherein the ensemble machine learning data model comprises a random forest model.

20. The computer readable medium of claim 15, wherein an optimum value for the possible class is determined based on a simulated annealing optimization.

\* \* \* \* \*